(12) United States Patent
Sheen et al.

(10) Patent No.: US 9,478,787 B2
(45) Date of Patent: Oct. 25, 2016

(54) DEVICE AND METHOD FOR ELECTROCHEMICAL DEVICE ELECTRICAL INTERCONNECTION

(71) Applicant: Aquion Energy Inc., Pittsburgh, PA (US)

(72) Inventors: Eric Martin Sheen, Pittsburgh, PA (US); Alan Douglas Munday, Canton, MI (US); William G. Campbell, Pittsburgh, PA (US)

(73) Assignee: AQUION ENERGY INC., Pittsburgh, PA (US)

( * ) Notice: Subject to any disclaimer, the term of this patent is extended or adjusted under 35 U.S.C. 154(b) by 116 days.

(21) Appl. No.: 14/083,644

(22) Filed: Nov. 19, 2013

(65) Prior Publication Data
US 2014/0079981 A1    Mar. 20, 2014

Related U.S. Application Data

(60) Provisional application No. 61/727,871, filed on Nov. 19, 2012.

(51) Int. Cl.
*H01M 2/20* (2006.01)
*H01M 2/10* (2006.01)

(52) U.S. Cl.
CPC ........... *H01M 2/202* (2013.01); *H01M 2/1077* (2013.01); *H01M 2/206* (2013.01); *Y10T 29/49108* (2015.01)

(58) Field of Classification Search
None
See application file for complete search history.

(56) References Cited

U.S. PATENT DOCUMENTS

| | | |
|---|---|---|
| 3,624,004 A | 11/1971 | Wennerberg |
| 4,014,817 A | 3/1977 | Johnson et al. |
| 4,231,631 A | 11/1980 | Guerinault et al. |
| 4,480,018 A | 10/1984 | DeBellis et al. |
| 4,542,444 A | 9/1985 | Boland |
| 4,650,733 A | 3/1987 | Cimino et al. |
| 4,693,535 A | 9/1987 | Frode |
| 5,348,498 A | 9/1994 | Morello et al. |
| 5,380,955 A | 1/1995 | Argyrakis et al. |
| 5,761,805 A | 6/1998 | Guyer |
| 5,956,225 A | 9/1999 | Okuyama et al. |
| 5,980,334 A | 11/1999 | Pyles |
| 6,589,904 B1 | 7/2003 | Iwasaki et al. |
| 6,592,838 B1 | 7/2003 | Nomoto et al. |

(Continued)

FOREIGN PATENT DOCUMENTS

| | | | |
|---|---|---|---|
| EP | 1134843 A2 | | 9/2001 |
| WO | WO2012063292 | * | 5/2012 |

OTHER PUBLICATIONS

International Preliminary Report on Patentability received in connection with international application No. PCT/US2013/070709; mailed May 28, 2015.

(Continued)

*Primary Examiner* — Patrick Ryan
*Assistant Examiner* — Wyatt McConnell
(74) *Attorney, Agent, or Firm* — The Marbury Law Group PLLC

(57) ABSTRACT

An electrochemical energy device includes a device housing and a pass-through connector extending through a wall of the device housing. The pass-through connector may include an electrically insulating connector housing having a quick connect feature and an electrically conductive pin located in the connector housing.

18 Claims, 15 Drawing Sheets

(56) References Cited

U.S. PATENT DOCUMENTS

| | | | |
|---|---|---|---|
| 6,629,863 | B2 | 10/2003 | Kieninger et al. |
| 6,787,235 | B2 | 9/2004 | Nesbitt et al. |
| 6,805,593 | B2 | 10/2004 | Spaulding et al. |
| 6,817,893 | B2 | 11/2004 | Schmid et al. |
| 7,344,421 | B1 | 3/2008 | Spencer |
| 7,374,464 | B1 | 5/2008 | Vicenza et al. |
| 7,569,514 | B2 | 8/2009 | Adrianov et al. |
| 7,625,252 | B2 | 12/2009 | Flynn et al. |
| 2001/0023037 | A1* | 9/2001 | Kieninger et al. ............ 429/100 |
| 2002/0180405 | A1* | 12/2002 | Batson ......................... 320/128 |
| 2004/0097369 | A1 | 5/2004 | Freel et al. |
| 2010/0105238 | A1* | 4/2010 | Good ................... H01R 13/639 439/357 |
| 2010/0233528 | A1* | 9/2010 | Kim et al. .................... 429/178 |
| 2011/0059342 | A1 | 3/2011 | Lee et al. |
| 2011/0165451 | A1 | 7/2011 | Kim et al. |
| 2012/0028097 | A1 | 2/2012 | Oury |
| 2012/0205149 | A1 | 8/2012 | Lenel |
| 2012/0214042 | A1* | 8/2012 | Wiegert ........................ 429/121 |
| 2013/0264134 | A1* | 10/2013 | Matsuda .................. B60K 1/04 180/68.1 |

OTHER PUBLICATIONS

Amphenol, Helios ModLink™ Modular Junction Box Base, http://www.amphenol-industrial.com/images/datasheets/IDS-50%20ModLink.pdf, Dec. 2013.

Amphenol, Amphenol H4 Comparison With MC4, http://www.energy-envi.com/amphonol/H4-COMPARED-TO-MC4.pdf, Dec. 2013.

Amphenol, HelioFuse, http://www.amphenol-industrial.com/images/datasheets/IDS-53%20HelioFuse.pdf, Dec. 2013.

Amphenol, HelioFuse, http://www.steinerpylenational.com/images/application_notes/IAN-71-In-Line-Fuse.pdf, Dec. 2013.

Amphenol, Helios Bulkhead Connector Assembly, http://www.pdfdoc.ru/connectors/electrical-power/solar-connectors/amphenol-solar-power/h4-male-half-bulkhead-panel-connector-pv-080509-m-700-9742/data-sheet-helios-bulkhead-connector-assembly-drawing, Dec. 2013.

Amphenol, Helios H4, http://eccochicago.com/wp-content/uploads/2012/08/Amphenol-H4-Circular-Solar-Connector.pdf, Dec. 2013.

Amphenol, Helios H4 Branch Connector, http://www.steinerpylenational.com/images/application_notes/IAN-72-Branch-Connectorpdf, Dec. 2013.

Amphenol, Helios H4 Panel Connector, Application Note, http://www.amphenol-industrial.com/images/datasheets/IDS-39%20H4%20Panel%20Connectorpdf, Dec. 2013.

Amphenol, Helios H4 Panel Connector, http://www.amphenol-industrial.com/images/appnotes/IAN-69%20H4%20Panel%20Connectorpdf, Dec. 2013.

Amphenol, Helios H4 Panel Connector: Panel, Plastic, Power Solar Connector, http://www.steinerpylenational.com/amphenol-pyle-national-h4-panel-connectors.html, Dec. 2012.

Amphenol, Helios Hercules PV Junction Box, http://www.amphenolindustrial.com/images/appnotes/IAN-73%20Hercules%20Junction%20Box.pdf, Dec. 2013.

Multi-Contact, Catalogue for Installers: MC3 and MC4, http://www.multi-contact.com/AcroFiles/Catalogues/PV_Solar-N_(en)_hi.pdf, Dec. 2013.

Tyco Electronics Corporation, Solarlok Residential Combiner Box, http://www.te.com/catalog/Presentations/SOLARLOK_Residential_Combiner_Box_FINAL.pdf, Dec. 2013.

Amphenol, HelioBolt™ Product Technical Data, http://www.amphenol-industrial.com/images/datasheets/IDS-59%20HelioBolt.pdf, Dec. 2013.

Amphenol, HelioClip™ Product Technical Data, http://www.amphenol-industrial.com/images/datasheets/IDS-58%20HelioClip.pdf, Dec. 2013.

Amphenol, HelloLug™ Product Description, http://www.amphenol-industrial.com/images/datasheets/IDS-52%20HelioLug.pdf, Dec. 2013.

Amphenol, HelioLug™ Application Note, http://www.annphenol-industrial.com/images/appnotes/IAN-79%20HelioLug.pdf, Dec. 2013.

Allstar Performance®, Quick Connect Battery Charging Posts, Product and Description, http://www.allstarperformance.com/specSheets/pdf/4.pdf, Dec. 2013.

International Search Report received in connection with international application No. PCT/US2013/070709; mailed Feb. 27, 2014.

European Office Communication Pursuant to Rule 164(1) EPC and Supplementary Partial European Search Report for European Patent Application No. EP 13 85 5847, dated Jul. 5, 2016, 7 pages.

* cited by examiner

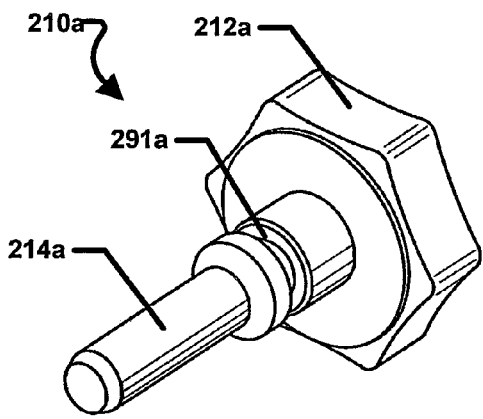
FIG. 2A
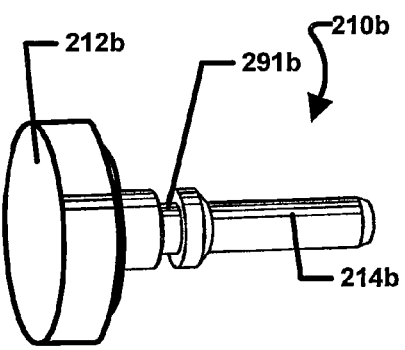
FIG. 2B
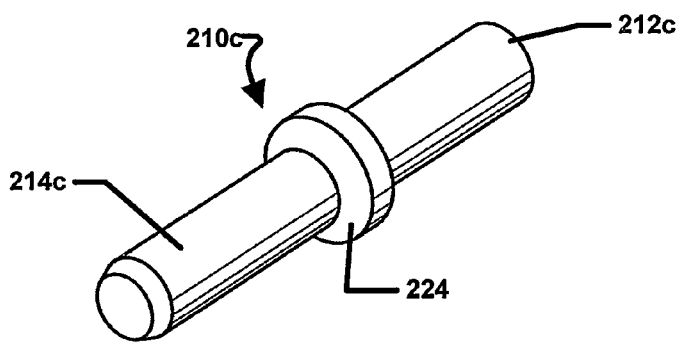
FIG. 2C
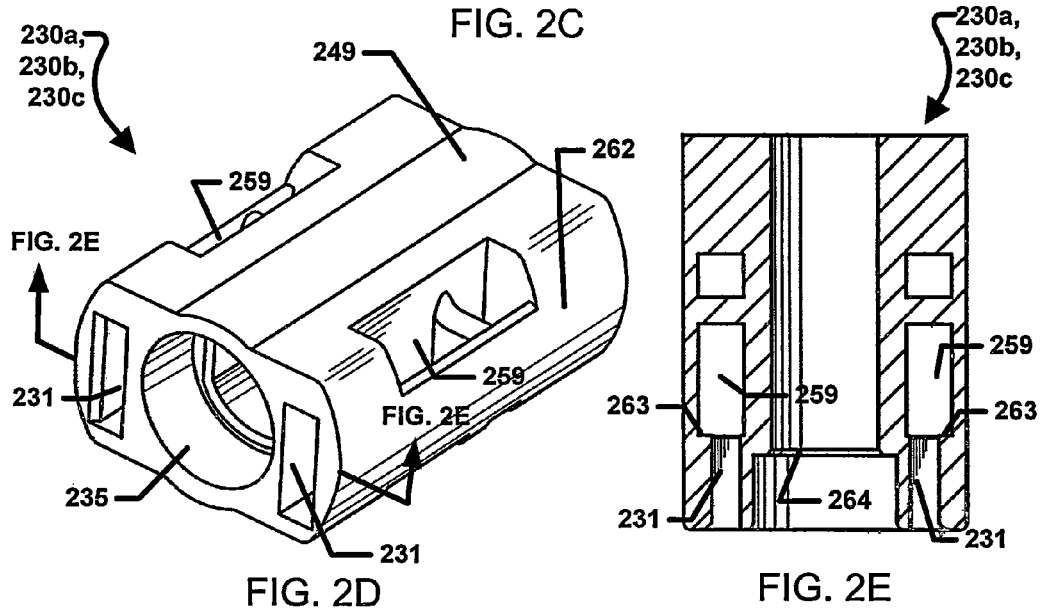
FIG. 2D
FIG. 2E

US 9,478,787 B2

DEVICE AND METHOD FOR ELECTROCHEMICAL DEVICE ELECTRICAL INTERCONNECTION

CROSS REFERENCE TO RELATED U.S. PATENT APPLICATION

The present application is a non-provisional application that claims priority to U.S. Provisional Patent Application Ser. No. 61/727,871, entitled "Device and Method for Electrochemical Device Electrical Interconnection" filed Nov. 19, 2012, which is incorporated herein by reference in its entirety for all purposes.

FIELD

The exemplary, illustrative, technology herein relates to electrical terminal embodiments and connection methods used to electrically interconnect electrochemical energy storage cells. In particular, the invention relates to an electrochemical energy device housing that includes one or more electrical terminal elements formed integrally with the device housing and an electrical jumper for interconnecting electrical terminals of one housing with electrical terminals of a different housing.

BACKGROUND

Small renewable energy harvesting and power generation technologies (such as solar arrays, wind turbines, micro sterling engines, and solid oxide fuel cells) are proliferating, and there is a commensurate strong need for intermediate size secondary (rechargeable) energy storage capability.

SUMMARY

A device of the various embodiments includes an energy storage device with a device housing and a pass-through connector extending through a wall of the device housing. The embodiment may include a pass-through connector with an electrically insulating connector housing having a quick connect feature and an electrically conductive pin located in the connector housing.

A device of the various embodiments includes a stack of electrochemical energy storage devices including a stack device housings where each device housing in the stack contains a plurality of electrochemical storage cells located inside the device housing. Each device housing in the stack may also include a pass-through connector extending through a wall of the device housing where the pass-through connector includes an electrically insulating connector housing having a quick connect feature and an electrically conductive pin located in the connector housing. Each device housing in the stack may also include at least one electrical conductor which electrically connects the pin to at least one electrochemical storage cell and a jumper wire assembly electrically connecting the pass-through connector of a first device housing in the stack to a pass-through connector of a second device housing in the stack. The stack may also include a jumper wire assembly having a wire, a first connector on a first end of the wire and a second connector on a second end of the wire. The first connector may include an electrically insulating connector housing having a quick connect feature which is connected to the quick connector feature of the pass-through connector of the first device housing. The first connector may include an electrically conductive pin located in the connector housing which is in electrical contact with the pin of the pass-through connector of the first device housing. The second connector may include an electrically insulating connector housing having a quick connect feature which is connected to the quick connector feature of the pass-through connector of the second device housing. The second connector may also include an electrically conductive pin located in the second connector housing which is in electrical contact with the pin of the pass-through connector of the second device housing.

A method of the various embodiments may include a method for making a pass-through connector for an electrochemical energy storage device. The method may include placing a pin or a pin and a connector housing in a mold and molding the electrochemical energy storage device housing around the connector housing or pin.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 2A illustrates an isometric view of an embodiment male connector pin for a pass through electrical connector.

FIG. 2B illustrates an isometric view of another embodiment male connector pin for a pass through electrical connector.

FIG. 2C illustrates an isometric view of another embodiment male connector pin for a pass through connector according to another aspect of the present invention.

FIG. 2D illustrates an isometric view of an embodiment electrically insulating connector housing according to an aspect of the present invention.

FIG. 2E is a cut-away view of FIG. 2D showing an embodiment electrically insulating connector housing.

DETAILED DESCRIPTION

The various embodiments will be described in detail with references to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

Embodiments of the invention are drawn to electrochemical energy storage devices and systems, such as primary and secondary batteries and asymmetric/hybrid energy storage systems described below. While secondary hybrid aqueous energy storage devices described below are preferred embodiments of the invention, the invention is also applicable to any suitable electrochemical energy storage systems, such as aqueous and non-aqueous electrolyte containing batteries (e.g., having anodes and cathodes which intercalate ions from the electrolyte, including Li-ion batteries, etc.) or electrolytic capacitors (also known as supercapacitors and ultracapacitors).

Figure 1:
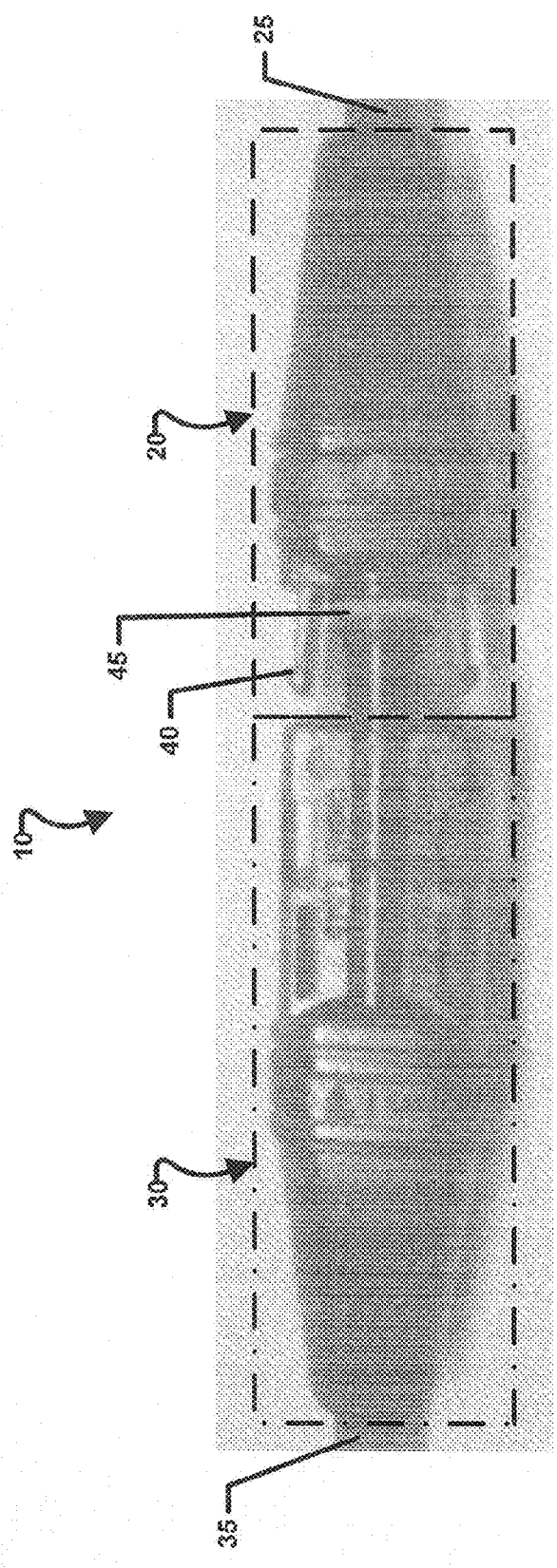
FIG. 1 illustrates an exemplary conventional locking power connector.

FIG. 1 illustrates a conventional electrical power connector 10 constructed for reliable performance and safe operation. Such connectors are available from Amphenol Corporation of Wallingford Conn., USA under the trade name HELIOS H4. A first portion 20 terminates a first conductive insulated wire 25 and a second portion 30 terminates a second conductive insulated wire 35. In the example, the first portion includes male mechanical interlock element 40 extending therefrom for mechanically interfacing with corresponding mechanical female interlock elements formed inside the second portion 30 to receive and retain, during operation, the male interlock element 40. The first portion includes a moisture sealing element 45, such as an o-ring and the second portion includes a surface for mechanically interfacing with the sealing element 45 to prevent moisture from penetrating the connector elements when they are assembled. Each portion 20, 30 houses a conductive electrical terminal (not shown) that electrically interfaces (e.g. pigtails) with the corresponding wire 25, 35.

When using the conventional electrical power connector to electrically connect a plurality of sealed electrochemical energy devices, it can be extremely difficult to interface one of its connector portions (e.g., connector portion 20, 30) to internal elements of the sealed electrical chemical energy device. When interfacing a connector portion to internal components, the internal components may be unintentionally exposed external elements (e.g., water, oxygen, dirt, etc.) which may degrade the performance of the electrochemical device because the interface is awkward (e.g., not a complementary fit between components).

One solution includes terminating internal electrical connections inside the energy storage housing and passing an insulated wire through the sealed housing and attaching a connector portion (e.g., either connector portion 20, 30) to an external end of the insulated wire extended through the housing. However, this solution requires the wire to be terminated twice: once inside the housing and once outside the housing. While this solution does decrease contaminants from entering the electrical energy storage device housing, this solution increases the operating cost of the electrochemical energy device while lowering the long-term reliability of the electrochemical cell electrical system, which can fail at each two terminal connections.

Exemplary System Architecture

Using a pass-through terminal may avoid the need for a second electrical terminal or connector inside the device housing or casing. Such a pass-through terminal may include a conductor that passes through a wall of an electrochemical energy device housing to terminate internal conductors (e.g. conductors leading from internal energy storage cells inside the electrochemical energy device housing). The pass-through terminal may also interface with an external connector outside the housing.

However, a pass-through terminal is often difficult to interface with outside the housing because it lacks a standard connector interface. In particular, many pass-through terminals are not usually connectors with a quick connect feature and instead use cumbersome attaching means, such as threaded fasteners, spring loaded clamps or the like. Additionally, pass-through terminal connections often suffer from a lack of integral electrical insulation and moisture sealing elements requiring a separate insulating or moisture-sealing element to be installed. While this solution avoids two wire terminations, the need for separate insulating and moisture sealing elements and the lack of a secure attaching device may impact reliability and user safety when not installed properly.

Male Connector Pin and Housing to Receive Male Connector Pin

FIGS. 2A-2C illustrates three examples of male connector pins suitable for use in the following embodiments.

In an embodiment, the male connector pin 210a includes anchoring features designed to improve mechanical integration with the energy storage device housing 150 (shown in FIG. 3A), such as recessed anchoring features, such as a groove 291*a*. The feature 291*a* may also be any features designed to improve mechanical integration with the energy storage device housing 150, such as one or more recesses, undercuts, channels, or other features that are designed to securely fit with the energy storage device housing 150. These features may help the pin fit securely with the energy storage device housing or may be surrounded by or filled with molding material used to form the energy storage device housing during a molding process. The groove may help support/stabilize the male connector pin 210*a*. The male connector pin 210*a* may also include a flat top terminal 212*a* used to connect to or terminate internal conductors (e.g., conductors leading from internal energy storage cells inside the electrochemical energy device housing). The flat top terminal 212*a* may have a polygonal shape such as hexagonal shape or any other shape. In an embodiment, the male connector pin 210*a* includes a connecting end 214*a* to connect with a mating female connector pin 220, described below.

FIG. 2B illustrates another embodiment male connector pin 210*b* similar to male connector pin 210*a* of FIG. 2A. The male connector pin 210*b* may include a non-polygonal top terminal 212*b*, such as a round or circular top. The male connector pin 210*b* may also include a groove 291*b*. In an embodiment, the male connector pin 210*b* includes a connecting end 214*b* to connect with a mating female connector pin 220, described below.

FIG. 2C illustrates another embodiment male connector pin 210*c* similar to male connector pins 210*a* and 210*b*. However, the male connector pin 210*c* may include one or more protruding anchoring features 224 such as raised ridges, shoulders, or other protrusions extending radially out from the connector pin or element with a wall of the energy storage device housing 150. The male connector pin 210*c* may include a terminal connecting end 212*c* that connects to or terminate internal conductors (e.g., conductors leading from internal energy storage cells inside the electrochemical energy device housing). In an embodiment, the male connector pin 210*c* includes a connecting end 214*c* to connect with a mating female connector pin 220, described below.

Each of the male connector pins 210*a*-210*c* may be either insert molded in the energy storage device housing 150 or may be installed after molding the energy storage device housing.

FIG. 2D illustrates an embodiment of an electrically insulating connector housing (i.e., a first connector housing) for the male connector pin 210*a*-210*c*. Although only one first connector housing is shown, the first connector housing is labeled 230*a*, 230*b*, and 230*c* depending on which male connector pin it houses. For example, each first connector housing 230*a*, 230*b*, 230*c* insulates and houses the male connector pin 210*a*, 210*b*, 210*c*, respectively.

Each first connector housing 230*a*, 230*b*, 230*c* includes an insulating shield 249, which directly houses the respective male connector pin 210*a*, 210*b*, 210*c*.

Each first connector housing may include a hollow cavity 259 for which locking features 331 (shown in FIG. 2G) may spring into engagement with the engagement surface 263 (which is shown in FIG. 2E). Each first connector housing may also include a perimeter wall 262 made out of a moldable insulating plastic. Further, each first connector may include one or more rectangular holes 231, which are configured for receiving locking features, which deflect the locking features as they pass through.

FIG. 2E is a cut-away view of FIG. 2D showing an embodiment insulating protective shield according to an aspect of the present invention. As in FIG. 2D, FIG. 2E illustrates the hollow cavities 259 for which locking features may spring into engagement with the engagement surface 263. Also two rectangular holes 231 are shown, which are configured for receiving locking features, which deflect the locking features as they pass through. The first connector housing 230*a*, 230*b*, 230*c* illustrated may also include a mating feature 264 that may receive the o-ring from the second connector housing 237 (illustrated in FIG. 2G). When the second connector housing is connected to first connector housing, the mating feature 264 may form a substantially liquid and gas-tight seal to prevent liquids and gasses from penetrating the interlocked connector housings.

Female Connector Pin

Figure 2F:
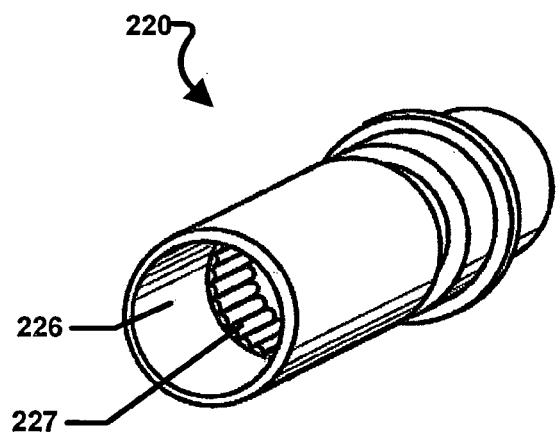
FIG. 2F illustrates an isometric view of an embodiment female connector pin for an electrical connector.

FIG. 2F illustrates an embodiment female connector pin 220 suitable for use in the various embodiments to retain male connector pins 210*a*, 210*b*, or 210*c* while maintaining good electrical contact between the male and female connector pins. In an embodiment, the female connector pin 220 includes a hollow inner cavity 226 and a male connector pin (e.g., male connector pin 210*a*, 210*b*, 210*c*) may sit in/interface with the inner cavity 226 of female connector pin 220.

The female connector pin 220 may also include contact enhancing features 227 internal to connector pin. The contact enhancing features 227 are designed to improve electrical contact between at least one of the male connector pins 210*a*, 210*b*, 210*c* and the female connector pin 220. In an embodiment, the contact enhancing features 227 are thin strips (e.g., ribs) of electrically conductive material that are elastically deformed when a male connector pin 210 sits in the inner cavity 226 of the female connector pin 220. The deformed contact enhancing features 227 may exert mechanical spring force against the male connecting pin to maintain good electrical contact. In an alternative embodiment, the ribs may be located on the outer surface of the male connector pins 210*a*, 210*b*, 210*c* or on both the outer surface of the male connector pin(s) 210*a*, 210*b*, 210*c* and the inner surface of the female connector pin 220.

Jumper Cable

Figure 2G:
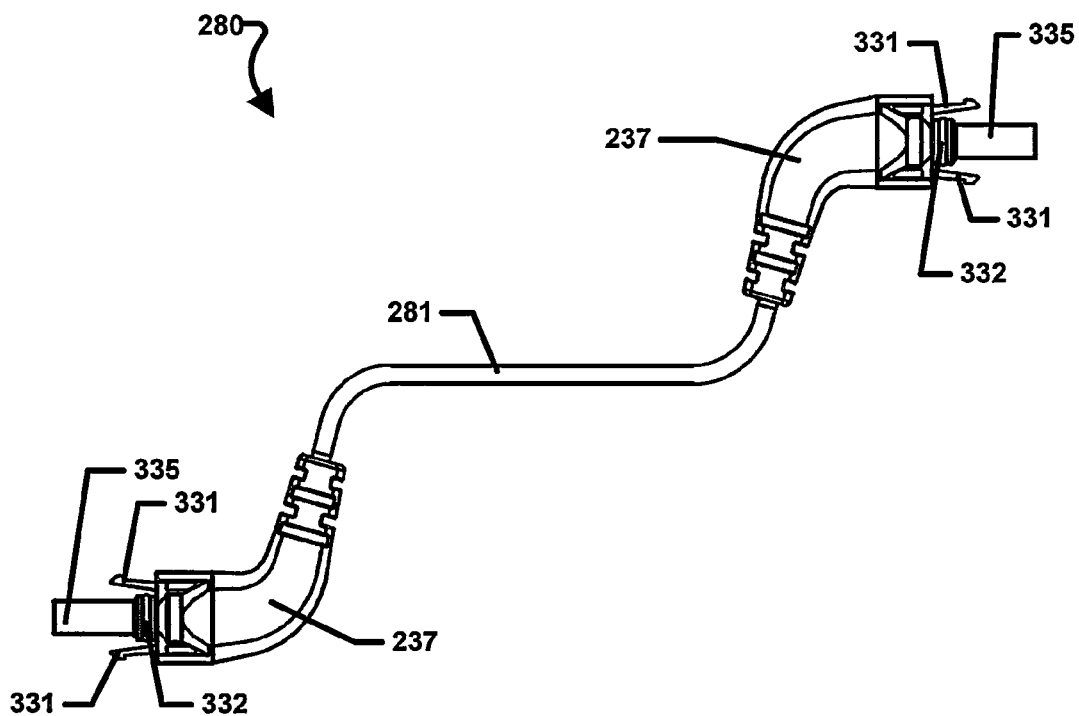
FIG. 2G illustrates an embodiment jumper cable assembly suitable for use with embodiments of the present invention.

FIG. 2G illustrates a jumper cable assembly 280 suitable for use in the various embodiments. The jumper cable assembly 280 includes a jumper wire 281 (e.g., insulated wire or jumper cable) and a second connector housing 237 that is formed integral to jumper wire 281. As shown, the jumper wire assembly 280 may include the jumper wire 281 that is terminated on both ends by the second connector housings 237. In some embodiments, the jumper wire 281 is end terminated by the female connecting pin 220 (not shown), which may be surrounded and insulated by an insulating protective shield 335. The female connector pin 220 is assembled into the second connector housing 237.

In some embodiments, the second connector housing 237 is insert molded to enclose female connecting pin 220 and the jumper wire 281. In some embodiments, the second connector housing may include a quick connect feature shown as locking features 331 that mates and is retained by another quick connect feature shown as retaining features (e.g., the rectangular holes 231, the hollow cavity 259, and the engagement surface 263) of the first connector housings 230*a*, 230*b*, 230*c* illustrated in FIGS. 2G and 2D. As previously discussed, the retaining features of the first connector housings include the rectangular holes 231, the hollow cavity 259, and the engagement surface 263. The locking features of the second connector housing enter the first connector housing through the rectangular holes 231, rest in the hollow cavity 259, and engage (e.g., lock into place or stabilize) with the engagement surface 263.

In an embodiment, the second connector housing 237 includes an o-ring 332 designed to interface with mating feature 264 on the first connector housing 230a, 230b, 230c to form a substantially liquid and gas-tight seal to prevent liquids and gasses from penetrating the interlocked connector housings and degrading terminal contacts inside.

Electrochemical Energy Storage Device Embodiments

Various embodiments include, the jumper wire assembly 280 connected to a pass-through connector 300a, 300b (illustrated in FIGS. 3A and 3B) by connecting the second connector housing 237 to the first connector housing 230a, 230b, 230c.

Figure 3A:
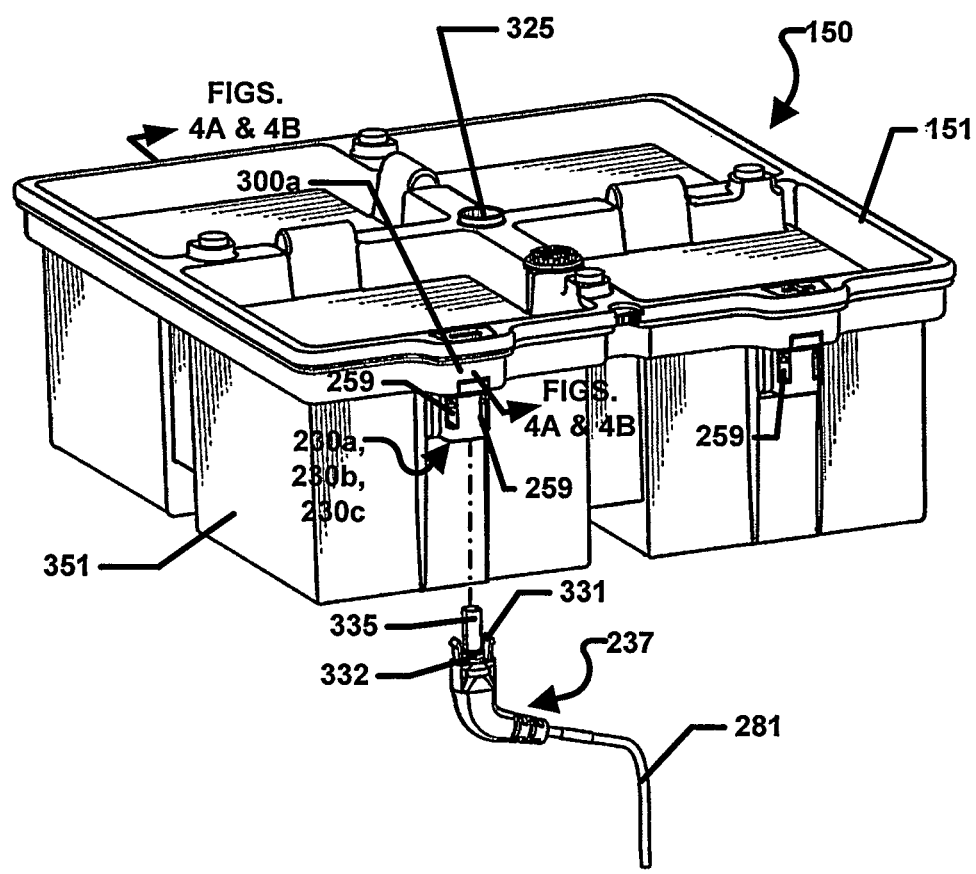
FIG. 3A illustrates an isometric view of an embodiment electrochemical energy device housing including pass-through connectors with a first connector housing.

FIG. 3A illustrates an embodiment that includes the first connector housing 230a, 230b, 230c as a part of the electrical energy storage device housing 150 such as a molded polymer housing.

The electrical energy storage device housing has a base portion 351, a lid 151, and a center through-hole 325. The jumper cable may include the second connector housing 237 with the locking features 331, the o-ring 332, and the insulating protective shield 335. As illustrated, the first connector housing is incorporated into the pass-through device housing 300a. The first connector housing has rectangular holes 231 (not shown) connected to hollow cavities 259, both of which are configured for receiving locking features 331 from the second connector housing 237 attached to the jumper cable 281. The second connector housing has the o-ring 332 and locking features 331.

In an embodiment, the electrical energy storage device includes a separate lid 151 or cover, which is positioned on top of the base portion 351. The lid 151 is removable to permit assembly of the energy storage cells inside the base portion. After assembly, the lid 151 is attached to the base portion 351 and sealed. A liquid electrolyte may substantially fill the electrical energy storage device housing 150 and the housing 150 preferably includes one or more ports or vents usable to add the liquid electrolyte and or vent excess gas pressure without removing the lid.

In an embodiment, the base portion 351 and lid 151 are molded elements comprising a moldable structural plastic material formed by any suitable plastic molding process such as thermo forming, vacuum forming, blow molding, injection molding, or the like. Specifically, the male connector pin 210a, 210b, 210c, may be inserted into the molded base portion 351 either during the molding process (e.g., an insert injection molding process) or in a post molding operation. Alternately, a female connector pin 220, shown in FIG. 2F, may be insert molded into the base portion 351 instead of the male connector pin 210a, 210b, 210c without deviating from the present invention.

In an embodiment, the entire housing base portion 351 includes an electrically insulating structural plastic material such as polypropylene or other moldable materials having similar properties. Accordingly, the first connector housings 230a, 230b, 230c are electrically insulated.

Figure 4A:
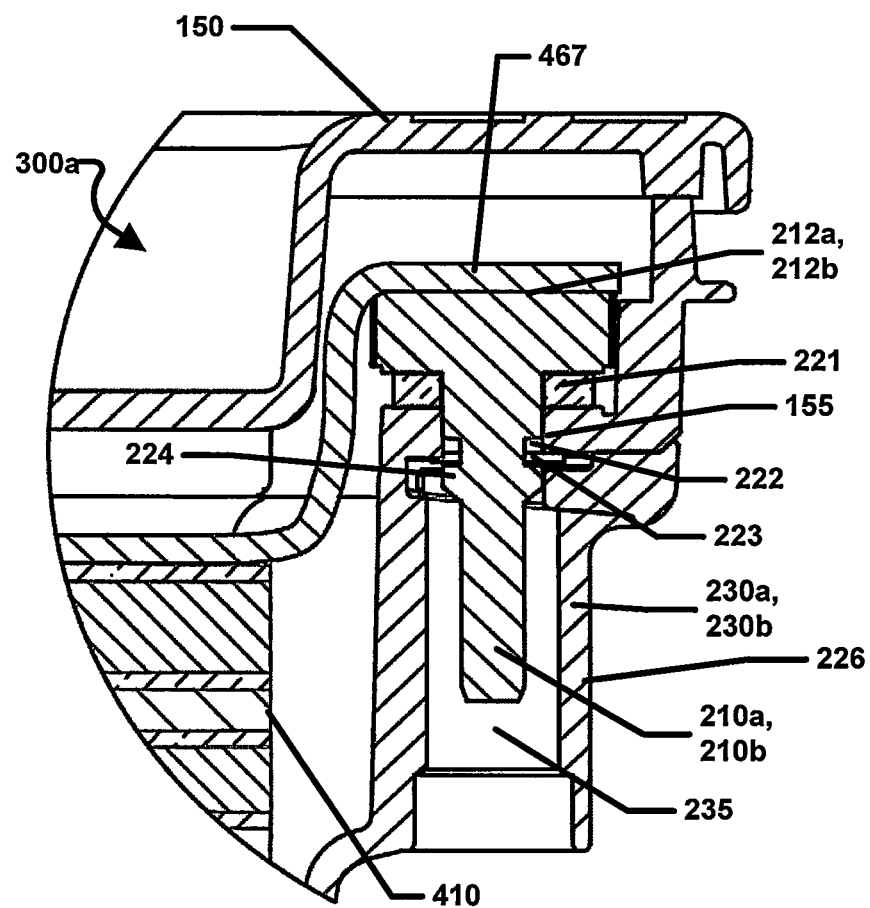
FIG. 4A is a cut-away view of FIG. 3A showing an embodiment male pass through electrical connector with male connector pin 210a, 210b.
Figure 4B:
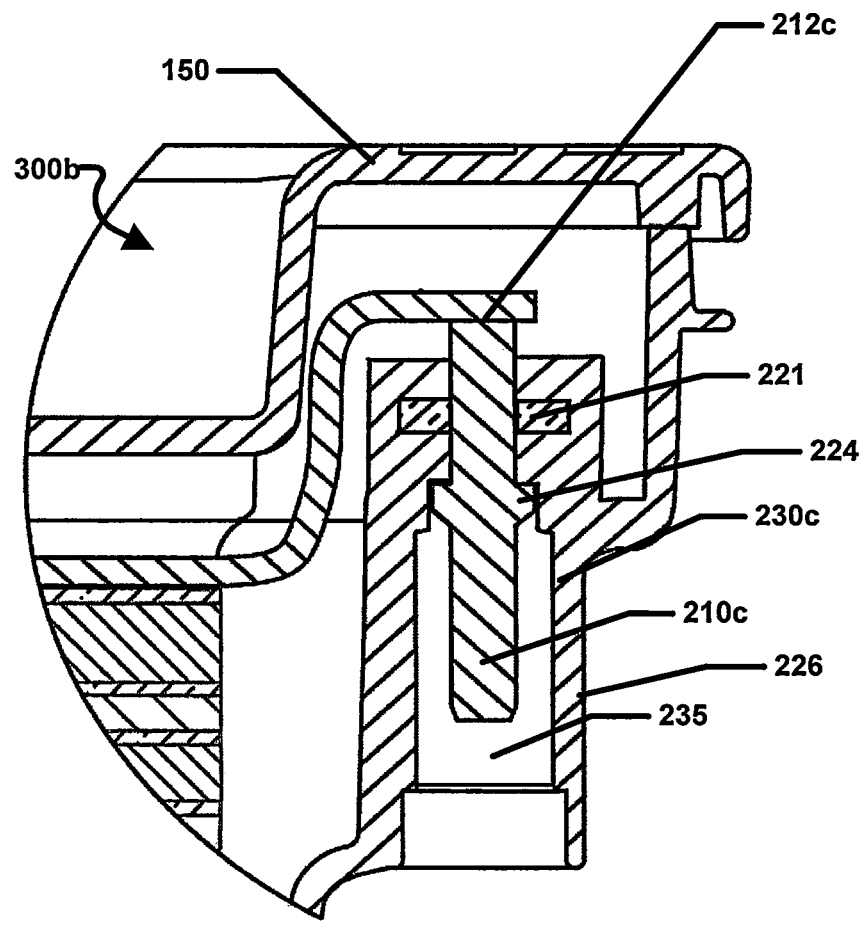
FIG. 4B is a cut-away view of FIG. 3A showing an embodiment male pass-through electrical connector with male connector pin 210c.

Briefly referring to FIGS. 4A and 4B, the connector housing 230a, 230b, 230c (shown in FIG. 3A) may be formed to substantially capture a terminal end 212a, 212b, 212c of the male connector pin 210a, 210b, 210c in the through hole 155 and to provide a substantially cylindrical hollow cavity 235 surrounding a connecting end 214a, 214b, 214c (shown in FIGS. 2A-2C, respectively) of the male pin 210a, 210b, 210c. The hollow cavity 235 may be bounded by a perimeter wall 226 which is formed with sufficient stiffness to protect the connecting end 214a, 214b, 214c of male pin 210a, 210b, 210c from physical damage. The perimeter wall 226 may form a lower aperture 235 sized to receive a portion of the second connector housing 237 therein.

Figure 3B:
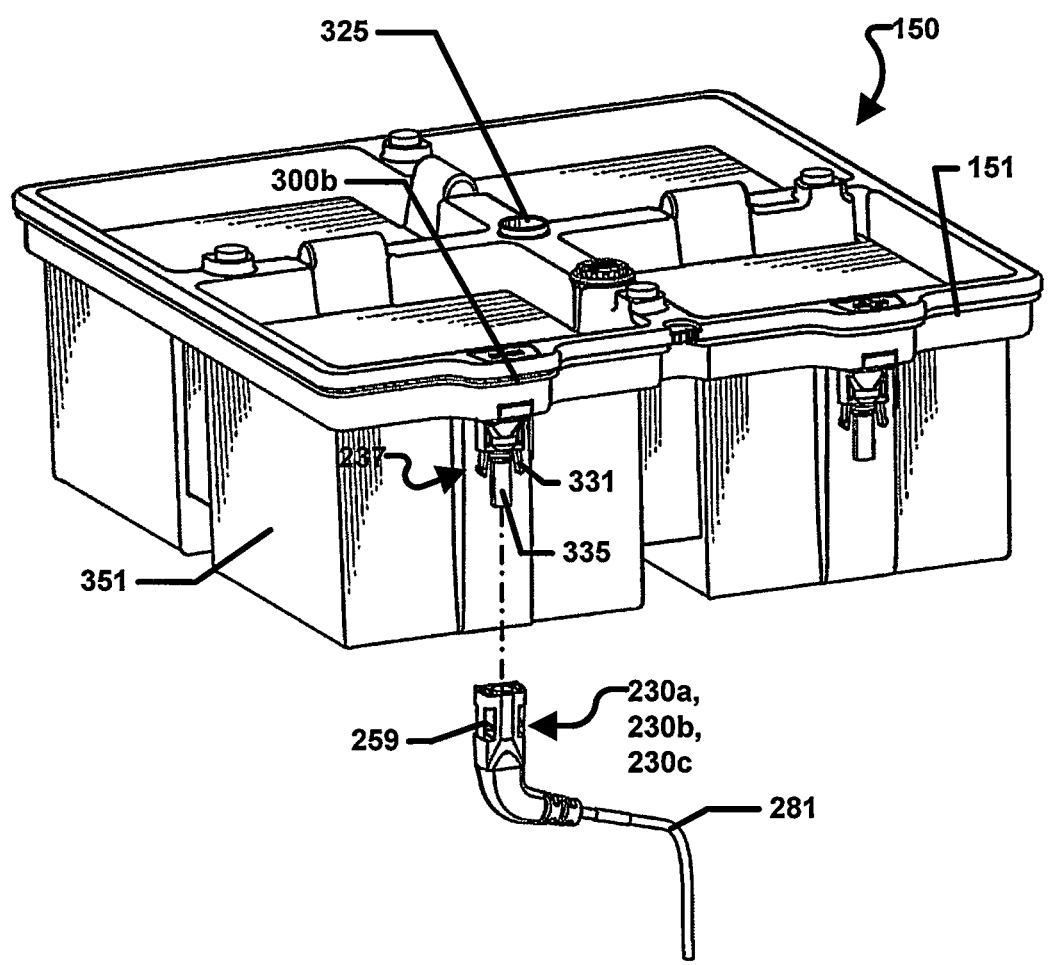
FIG. 3B illustrates an isometric view of an embodiment electrochemical energy device housing including pass through connectors with a second connector housing.

FIG. 3B illustrates an embodiment pass-through connector 300b that includes the second connector housing 237 as a part of the electrical energy storage device housing 150. The second connector housing on the electrical energy storage device housing 150 includes locking features 331, an insulating protective shield 335, and a female connector pin 220 housed inside. Likewise, the jumper cable 281 may include the first connector housing 230a, 230b, 230c with a male connector pin 210a, 210b, 210c housed inside.

In an embodiment, the pass-through the connector 300b includes the second connector housing 237 formed integral to the electrochemical energy storage device housing 150 base portion 351. Similarly, the first connector housing 230a, 230b, 230c (e.g., the mating pair of the second connector housing 237) is formed integral to the jumper wire 281. In other words, the first connector housing 230a, 230b, 230c with the male connector pin 210a, 210b, 210c and the second connector housing 237 with the female connector pin 220 (not shown because it is enclosed by the second connector housing) of FIG. 3A are reversed. In particular, the polarity of electrical elements and connector housings are reversed. Thus, the male connector pin 210a, 210b, 210c terminates jumper wire 281 and is enclosed by the first connector housing 230a, 230b, 230c while the female connector pin 220 is enclosed by the second connector housing 237 with a terminal contact disposed inside the energy storage device housing 150 for connection with or termination of internal electrical conductors.

In an embodiment, the insulating protective shield 335 may sit in the inner cavity 235 and the locking features 331 may engage with the retaining features 259 as a bayonet connector when connecting the first and second connector housings. In an embodiment, the locking features provide a snap lock or quick connect that locks the first and second connector housings together. In an embodiment, a disconnect tool is required to disengage the snap lock connection. When the first and second connector housings are connected, the o-ring 332 forms a fluid and gas-tight seal with the mating feature 232 to prevent liquids and gasses from penetrating the interlocked connector housings.

Further embodiments include additional arrangements of connector pins and connector housings. In some embodiments, the jumper wire assembly includes a jumper wire 281 terminated on both ends with a first connector housing 230 and male connector pin 210. In further embodiments, the jumper wire assembly 280 includes a jumper wire 281 terminated on both ends with a second connector housing 237 and a female connector pin 220. In further embodiments, the jumper wire assembly 280 includes a jumper wire 281 terminated at both ends with male connector pin 210a, 210b, 210c enclosed by a second connector housing 237 or with a female pin 220 enclosed by the first connector housing 230a, 230b, 230c and opposite pins/housings on the energy storage device housing 150.

In alternative embodiments, the jumper wire assembly 280 includes a first connector housing 230a, 230b, 230c at one end and a second connector housing 237 at the other end. Analogously, the energy storage device housing 150 has the complementary pair first connector housing or second connector housing depending on the desired connection. Such an arrangement/embodiment may provide for reduced error in connecting the various housings together with the jumper cable assembly 280. For example, each energy storage device housing 150a-150g may include a positive pass-through terminal 601a with a first connector housing 230a, 230b, 230c and a negative pass-through terminal 601b with a second connector housing 237. The jumper cable assembly may include one end with a second connector 237 housing to connect with the positive pass-through terminal 601a having a first connector housing of the energy storage device 150a. The other end of the jumper cable assembly may include a first connector housing 230a, 230b, 230c that connects with the negative pass-through terminal 601b having a second connector housing 237 of energy storage device 150b. Thus, only one end (e.g., the first connector housing 230a, 230b, 230c end) of the jumper cable assembly can be inserted into the positive pass-through terminals having the second connector housing 237 of the energy storage devices 150a-150g because the other end of the jumper cable assembly (e.g., the second connector housing 237 end) will only mate with the negative pass-through terminals of each energy storage device 150a-150g. In other words, each end of the cable assembly should fit in its appropriate connection with the energy storage device housing. In an embodiment, the ends of the cable assembly may be swapped such that either end may include the first connector housing 230a, 230b, 230c or the second connector housing 237.

Further embodiments include a connector housing 230a, 230b, 230c, or 237 formed separately from the housing 150 in a first manufacturing step and assembled onto electrochemical energy storage device housing 150 in a second manufacturing step.

Thus, in general, the pass-through connector housing in the energy storage device housing 150 can be a male or female type pass-through connector housing which contains either a male connector pin 210a, 210b, 210c or a female connector pin 220. Regardless of whether the pass-through connector housing of the energy storage device housing 150 is a first connector housing 230a, 230b, 230c with a male connector pin 210a, 210b, 210c or a female connector pin 220 or a second connector housing 237 with a male connector pin 210a, 210b, 210c or a female connector pin 220, the jumper wire assembly must have a mating pair. For example, if the first pass-through housing includes a first connector housing 230a with a male connector pin 210a, then the jumper wire assembly will contain the complementary second connector housing 237 with the female connector pin 220. If the first pass-through housing includes the second connector housing 237 with the female connector pin 220, then the jumper wire assembly includes the either of the first connector housings 230a, 230b, 230c with their respective male connector pin 210a, 210b, 210c. Still further embodiments of the combined connector housings 230a, 230b, 230c, 237, and energy storage device housing 150 include connecting and aligning features that improve the ease of assembly of connector housings onto energy storage device housing 150.

Connector Pin Installed into Housing After Molding

Figure 5:
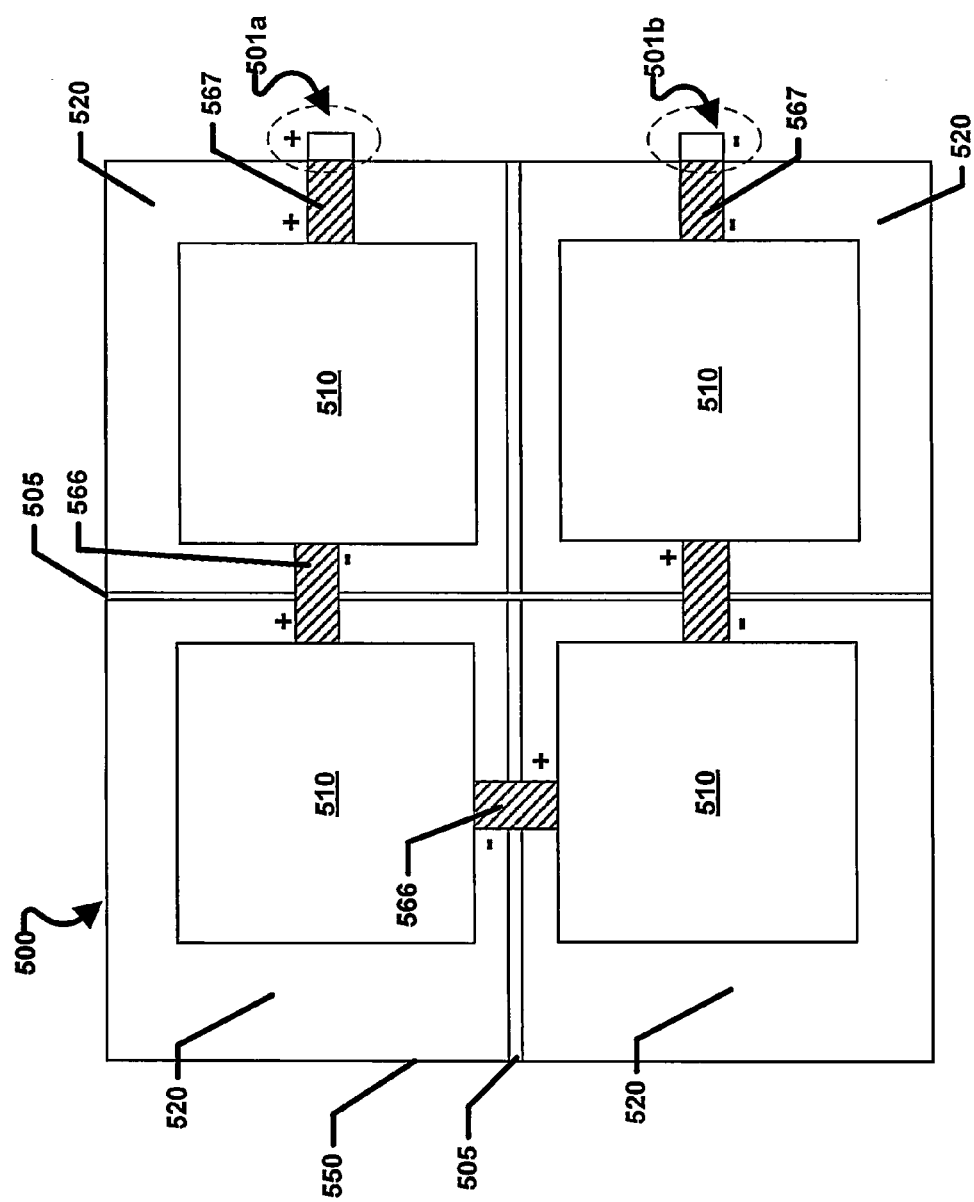
FIG. 5 illustrates a top schematic view of an embodiment electrochemical energy device showing internal current collecting elements terminated at connector pins passing through the electrochemical device housing.

FIG. 4A illustrates an embodiment of a pass-through connector 300a installed in the electrochemical energy storage device housing 150 with the first connector housing 230a or 230b connected to one or more chemical energy storage cells 410 (shown as 510 in FIG. 5).

In one exemplary assembly, the first connector housing 230a, 230b is assembled onto the energy storage device housing 150 by inserting the male connector pin 210a, 210b with sealing element 221 (e.g., an o-ring or washer) into through hole 155 of the energy storage device housing 150 and then pressing the first connector housing 230a, 230b with the integrated push connector 223 onto male connector pin 210a, 210b. In such an assembly, the push connector fits over the connector pin 210a, 210b securing the pin and connector housing in place.

In the non-limiting embodiment of FIG. 4A, a first connector housing 230a, 230b is formed integral to the energy storage device housing 150 in a first manufacturing step (e.g., as an integral part of the molded housing or as a separate element permanently attached to the molded housing) where the housing 150 base portion 351 is molded around the connector. In another embodiment, the pass-through connector includes a male connector pin 210a, 210b that is assembled onto or installed into the electrochemical energy storage device housing 150 and the first connector housing 230a, 230b in a second manufacturing step. For example, as a first manufacturing step, the electrochemical energy storage device housing 150 may be molded (e.g., injection molded) together with the first connector housing 230a, 230b to form the desired compartments and features. As a second manufacturing step, the male connector pin 210a, 210b may be screwed, snapped, and/or inserted through a hole into the first connector housing 230a, 230b of the energy storage device housing 150.

In an embodiment, the electrochemical energy storage device housing 150 includes a through hole 155 aligned with inner cavity 235 of the first connector housing 230a, 230b. As described above, the male connector pin 210a, 210b includes a flat, disc shaped, terminal 212 used to connect to or terminate internal conductors of the electrochemical energy storage device. In an embodiment, the male connector pin 210a, 210b is assembled into the pass-through connector by inserting the pin through hole 155 in the energy storage housing 150 (e.g., after the device housing 150 is molded), with a sealing element 221 interposed between terminal 212 and housing to form a substantially liquid and gas-tight seal. In an embodiment, the male connector pin 210b is secured (e.g., held in place) by one or more mechanical retaining elements, such as a push connector 223 backed by a flat washer 222 inserted into groove 291.

In an embodiment the male connector pin 210a, 210b includes anchoring features 224, 291a, 291b designed to be surrounded by or filled with molding material during a molding process or to interface with separate anchoring elements. Additionally, any of the raised or recessed features may be used to locate and anchor the inserted element in a desired operating position.

Connector Pin Insert Molded into Housing

FIG. 4B illustrates an embodiment pass-through connector 300b installed into an electrochemical energy storage device housing 150, such as a plastic or polymer housing having a base 351 and a lid 151. As illustrated, a male connector pin 210c is installed in the first connector housing 230c formed integral to the electrochemical energy storage device housing 150.

Specifically, in the non-limiting embodiment of FIG. 4B, the male connector pin 210c is installed into the energy storage housing 150 by insert molding it with the energy storage housing 150. A sealing element 221 may surround the male connector pin to form a liquid and gas tight seal. The sealing element 221 may also be insert molded with the male connector pin 210c or may be formed integral with the molded energy storage housing 150 and or the male connector pin 210c. Alternative or additional sealing components such as o-rings or other sealing components may be used to form a liquid and gas-tight seal. In some embodiments, additional sealing components are not used and the male connector pin 210c is insert molded without the addition of a separate sealing element 221. In some embodiments, the male connector pin 210c includes features to improve sealing such as one or more o-ring grooves or channels designed to be filled with the polymer material of the energy storage device housing 150 during a molding process used to form the energy storage device housing. In an embodiment, the male connector pin 210c may include anchoring features 224 designed to improve mechanical integration with the energy storage device housing 150.

In an embodiment and similar to FIG. 4A, the male connector pin 210c includes anchoring features 224 designed to be surrounded by or filled with molding material during a molding process or to interface with separate anchoring elements. Additionally, any of the raised or recessed features may be used to locate and anchor the inserted element in a desired operating position.

In the present embodiment, the first connector housing 230c is formed integral to the electrochemical energy storage device housing 150 (e.g., the connector housing 230c and pin 210c being molded/over-molded together with the device housing 150). The first connector housing 230c comprises an electrically insulating material formed to substantially surround the male connector pin 210c, providing mechanical protection and electrical insulation to the male connector pin 210c. The first connector housing 230c may include a hollow inner cavity 235 surrounding the male connector pin 210c. The inner cavity 235 is designed to interface with a mating protective shield 335 of the second connector housing 237 (shown in FIG. 3A) when the second connector housing 237 and the first connector housing 230 are interconnected.

In an embodiment, the insulating protective shield 335 (not shown) of the second connector housing 237 is inserted into the inner cavity 235 of the first connector housing 230c. In an embodiment, the inner surface of inner cavity 235 is shaped to mate with and guide the outer surface of protective shield 335 when connecting the first and second connector housings.

Electrical Connections

FIG. 5 illustrates the internal electrical connections of an embodiment electrochemical storage device. In an embodiment, the electrochemical energy storage device 500 includes housing 550 (also shown as device housing 150 base portion 351 in FIGS. 3A and 3B) that is divided into four cavities 520 by partition walls 505. While four cavities are illustrated, the invention is not limited to this configuration and any internal housing configuration may be used. Each cavity 520 contains one or more energy storage cell(s) 510, which in some embodiments includes an alternating stack of anode and cathode layers interspersed with separator layers and with electrolyte contained within the cavities 520. The cells may comprise battery cells, supercapacitor cells, or hybrid device cells in which the anode has supercapacitor characteristics and the cathode has battery characteristics, as described in U.S. patent application Ser. No. 13/666,452, entitled "Large Format Electrochemical Energy Storage Device Housing and Module," filed on Nov. 1, 2012 and incorporated herein by reference in its entirety. The energy storage cells 510 may also include current collectors (not shown) in electrical contact with anodes and cathodes of the cell. The flexible conductors 566 interconnect the current collectors of each cell and the terminating conductors 567 electrically connect the interconnected group of cells 510 to output terminals in pass-through terminals 501a, 501b, which may comprise connector terminal pads 212a, 212b, 212c formed integral with connector pins 210a, 210b, 210c located inside the first connector housing 230a, 230b, 230c, as described above.

In the present non-limiting example, the energy storage cells 510 of the electrochemical energy storage device 500 are connected in series. However, parallel connections are within the scope of the present invention. In some embodiments, flexible conductors 566 pass over the tops of separator walls 505 and are not in contact with the electrolyte contained within cavities 520 in base 351 portion of the energy storage device housing 351. In an embodiment, the flexible conductors 566, 567 are made from a conductive material that is resistant to degradation by conditions within the energy storage device. For example, flexible conductors 566, 567 may comprise stainless steel ribbons.

Each housing 150 includes a current collector terminating end 567 in electrical contact with each of a plurality of anodes (e.g., the anode of the negative pass-through terminal 501b) or cathodes (e.g., the cathode of the positive pass-through terminal 501a). The current collector terminating ends 467 are in electrical communication with flexible conductive ribbons 566 that extend to further current collecting elements in contact with, and preferably disposed between, cathode and anode layers. The conductive ribbons 566 electrically interconnect a plurality of energy storage cells disposed in each of the four energy storage cell areas 510. The energy storage cells may be connected in series, in parallel, or in a combination of series and parallel.

The current collector terminating end 567 is terminated to the male connector pin 210a, 210b, 210c of the first connector housing 230a, 230b, 230c of either the positive pass-through terminal 501a or the negative pass-through terminal 501b. In a preferred embodiment, the current collector terminating ends 567 are thermally attached to male connector pins or female conductor pins (e.g. by welding or soldering). In some embodiments, the flexible conductive ribbons 566 pass over the tops of separator walls 505 and are not in contact with electrolyte contained within cavities 520. In an embodiment, the flexible conductors 566, 567 are made from conductive material that is resistant to degradation by conditions within the energy storage device.

In an embodiment, the terminal conductors 567 are flexible conductors that are terminated at connector pins (e.g., male connector pins 210a, 210b, 210c) which pass through the housing 150 for connection with the jumper wire assembly 280. In an embodiment, the terminal conductors 567 are electrically connected to male connector pins 210a, 210b, 210c or to a female connector pin 220 by suitable means including by welding, soldering, mechanical fastening or clamping the flexible connectors 567 to terminal pads 212a, 212b, 212c or similar terminating surfaces of the connector pins. In preferred embodiments, terminating conductors 567 are thermally attached (e.g., by welding or soldering) to the male connector pin contact terminal disc 212a, 212b, 212c. In alternate embodiments, the terminating conductors 567 are thermally attached to the female connector pin contact terminal disc.

In an embodiment, the electrochemical energy storage device 500 has a positive pass-through terminal 501a and a negative pass-through terminal 501b. Some embodiments include the positive and negative terminals in swapped locations such that the positive terminal 501a is located at the current illustrated position of the negative terminal 501b and vice versa. So long as the electrochemical energy storage device includes both the positive pass-through terminal 501a and the negative pass-through terminal 501b, the exact location of the terminals is not critical.

Referring to FIGS. 2A, 2B and FIG. 5, the first connector housing 230a, 230b, 230c serves as power input/output terminals to energy storage cells 510 operating inside the housing 150. Negative and positive terminating conductors 567 connect to corresponding male connector pins 210a, 210b, 210c at a terminal connection on the respective terminal plate 212a, 212b, 212c. In an embodiment, the first connector housing 230a, 230b, 230c, includes a negative terminal conductor 567 and is connected to the male pin at the terminal plate 212a, 212b, 212c. Similarly, in an embodiment, the first connector housing 230a, 230b, 230c may include a positive terminal conductor 567 connected to the male connector pin 210a, 210b, 210c at a terminal plate 212a, 212b, 212c. Typically, the negative terminal connector is electrically connected to the anode of each energy storage cell operating inside the device housing 150 and the positive terminal conductor is electrically connected to the cathode of each energy storage cell operating inside the device housing 150. However, the polarities can be reversed and/or the energy storage cells inside the device housing 150 can be connected in series or in parallel without deviating from the present invention. According to an embodiment, each of the pass through electrical connector elements of the positive pass-through terminal 501a and the negative pass-through terminal 501b is substantially identical and comprises an external connector housing that is integrally formed with the housing base portion 351 (shown in FIGS. 3A and 3B). The first connector housing 230a, 230b, 230c may include both mechanical interface elements and conductive and insulating electrical elements.

FIGS. 6A-6I illustrate various views of an exemplary energy storage device with non-polygonal positive and negative pass-through terminals with first connector housings 230b, 230c. Preferably, the terminals are round, such as circular. Referring to non-limiting illustrations of FIGS. 6A-6F, the energy storage device may include a positive circular pass-through terminal 601a and a negative circular pass-through terminal 601b. The electrochemical energy storage device has one or more cavities 520 for holding one or more energy storage cell(s) 510 (illustrated in FIG. 5). The electrochemical energy storage device may have one or more flexible connector trenches 665 in the tops of walls 505. As illustrated, the electrochemical energy storage device may have a tie rod through-hole 325 for receiving a tie rod or another binding member that connects multiple energy device housings 150 on top of one another in a stack, as shown in more detail in FIG. 8.

Figure 6A:
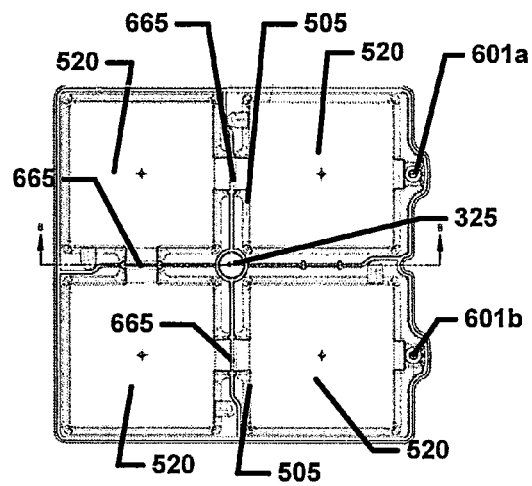
FIG. 6A illustrates a top view of an embodiment electrochemical energy device with non-polygonal positive and negative pass-through terminals.
Figure 6D:
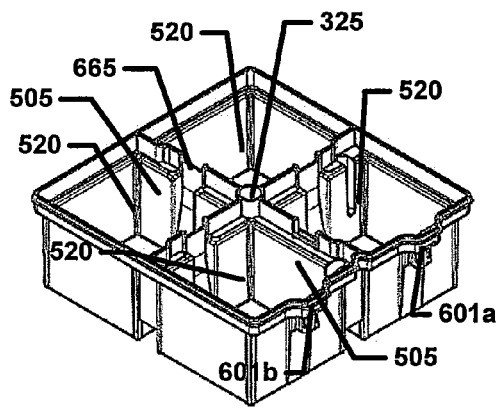
FIG. 6D illustrates an isomeric view of the embodiment electrochemical energy device of 6A.
Figure 6B:
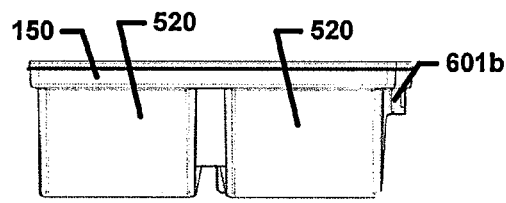
FIG. 6B illustrates a side view of the embodiment electrochemical energy device of 6A.
Figure 6E:
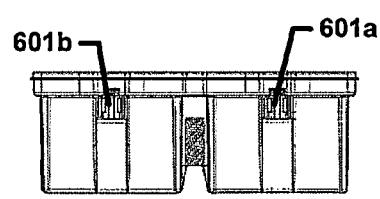
FIG. 6E illustrates a front view of the embodiment electrochemical energy device of 6A showing the front of both the positive and negative pass-through terminals.
Figure 6C:
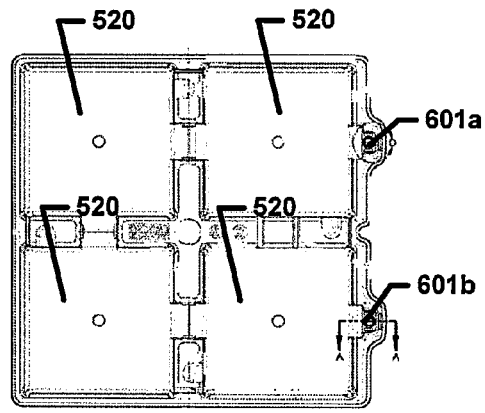
FIG. 6C illustrates a bottom view of the embodiment electrochemical energy device of 6A.
Figure 6F:
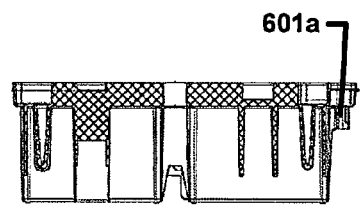
FIG. 6F illustrates a cut-away view of FIG. 6A showing the connections between energy storage cells of the exemplary electrochemical energy storage device housing.
Figure 6G:
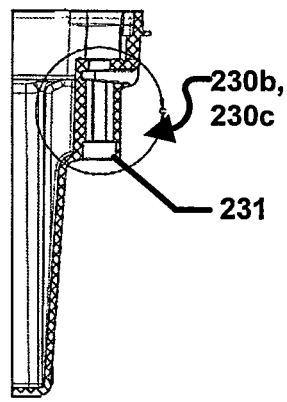
FIG. 6G illustrates a cut away view of the negative pass-though terminal of FIG. 6C.

FIG. 6G illustrates a cut-away view of the negative pass-though terminal 601b of FIG. 6C. In the non-limiting example, the negative pass-through terminal may include retaining features 231 of the first connector housing 230b, 230c similar to those illustrated in FIG. 3A. The retaining features are designed to interlock with locking features 331 of the second connector housing.

Figure 6H:
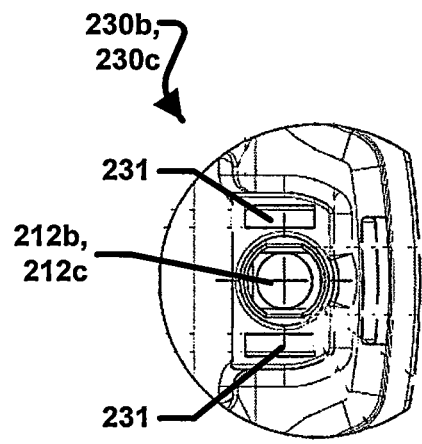
FIG. 6H illustrates a magnified view of the positive pass-through terminal of FIG. 6C.

FIG. 6H illustrates a magnified bottom view of the positive pass-through terminal 601a of FIG. 6C. As illustrated, the first connector housing may have one or more (or at least two) polygonal, preferably rectangular, retaining sockets as retaining features 231 for each first connector housing. The retaining features are designed to allow a quick connection with a second connector housing attached to the jumper cable assembly 280. As clearly illustrated, the first connector housing 230b, 230c may include a non-polygonal pass-through terminal. As a further example, the pass-through terminal may be a circular pass-through terminal.

Figure 6I:
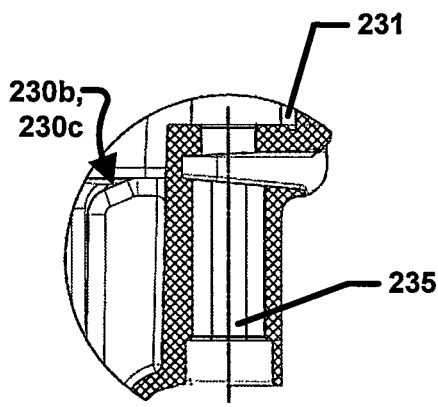
FIG. 6I illustrates a cut away view of the negative pass-through terminal of FIG. 6G.

FIG. 6I illustrates a magnified view of the negative pass-through terminal of the cut-away view of FIG. 6G. The first connector housing 230b, 230c may include a hollow inner cavity 235 where a male connector pin may reside.

FIGS. 7A-7E illustrate various views of a different embodiment electrochemical energy device with polygonal (e.g., hexagonal) positive and negative pass-through terminals having a first connector housing 230a. Referring to non-limiting illustrations of FIGS. 7A-7C, the electrochemical energy storage device may include a positive polygonal pass-through terminal 701a and a negative polygonal pass-through terminal 701b. Similar to FIGS. 6A-6F, the electrochemical energy storage device has at least one cavity 520 for holding one or more energy storage cell(s) 510 (illustrated in FIG. 5).

Figure 7A:
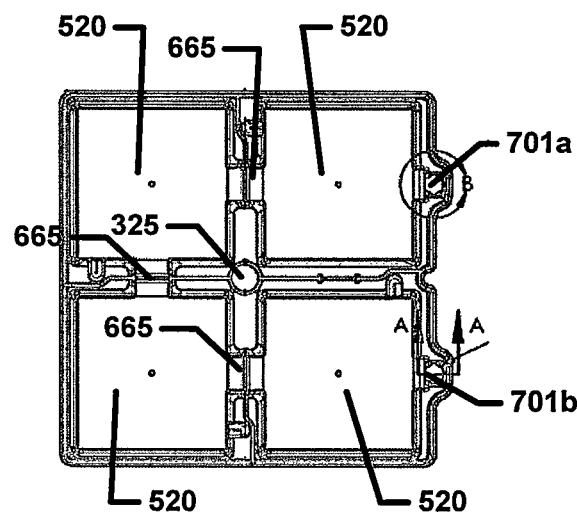
FIG. 7A illustrates a top view of an embodiment electrochemical energy device with polygonal positive and negative pass-through terminals.
Figure 7B:
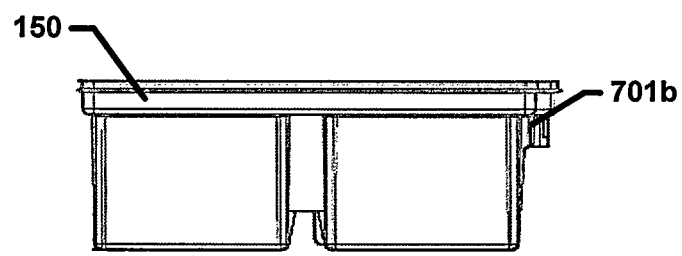
FIG. 7B illustrates a side view of the embodiment electrochemical energy device of FIG. 7A.
Figure 7C:
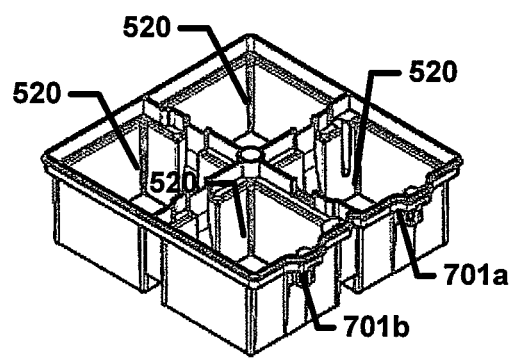
FIG. 7C illustrates an isomeric view of the embodiment electrochemical energy device of FIG. 7A.
Figure 7D:
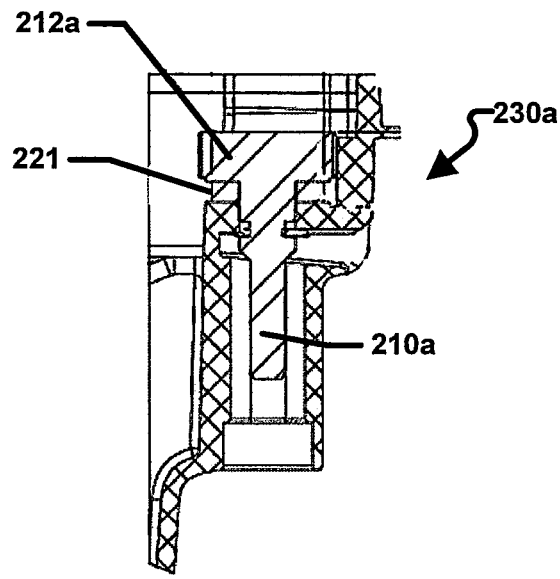
FIG. 7D illustrates a cut-away view of the negative pass-through terminal of the embodiment electrochemical energy device of FIG. 7A.

FIG. 7D illustrates a cut-away view of a negative polygonal (e.g., hexagonal) pass-through terminal 701b of FIG. 7A. As shown, the first connector housing 230a may include a male connector pin 210a with a flat terminal plate 212a. In an embodiment, the flat terminal plate may be polygonal (e.g., hexagonal) or non-polygonal (e.g., round). The male connector pin 210a may rest on the sealing element 221, such as a gasket (e.g., a gasket comprising uncoated silicone).

Figure 7E:
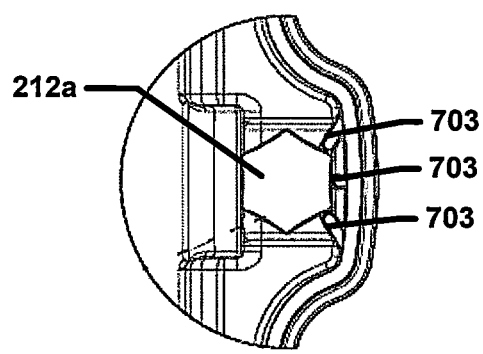
FIG. 7E illustrates a magnified view of the positive pass-through terminal of the embodiment electrochemical energy device of FIG. 7A.

FIG. 7E illustrates a magnified view of the positive polygonal pass-through terminal 701a of FIG. 7A. As shown, the male connector 210a may have a polygonal (e.g., hexagonal) shaped flat terminal plate 212a. The polygonal shape combined with the anti-rotational features 703 (e.g., protrusions in the first connector housing 230a, 230b) keep the male connector pin in place to ensure that the male connector pin may firmly fit within the energy storage device housing 150. In an embodiment, at least two anti-rotational features are needed to keep the polygonal-shaped terminal plate from rotating. In an embodiment, each polygonal pass-through terminal may include three or more anti-rotational features to keep the male or female connector pin from rotating in the pass-through terminal.

Figure 8:
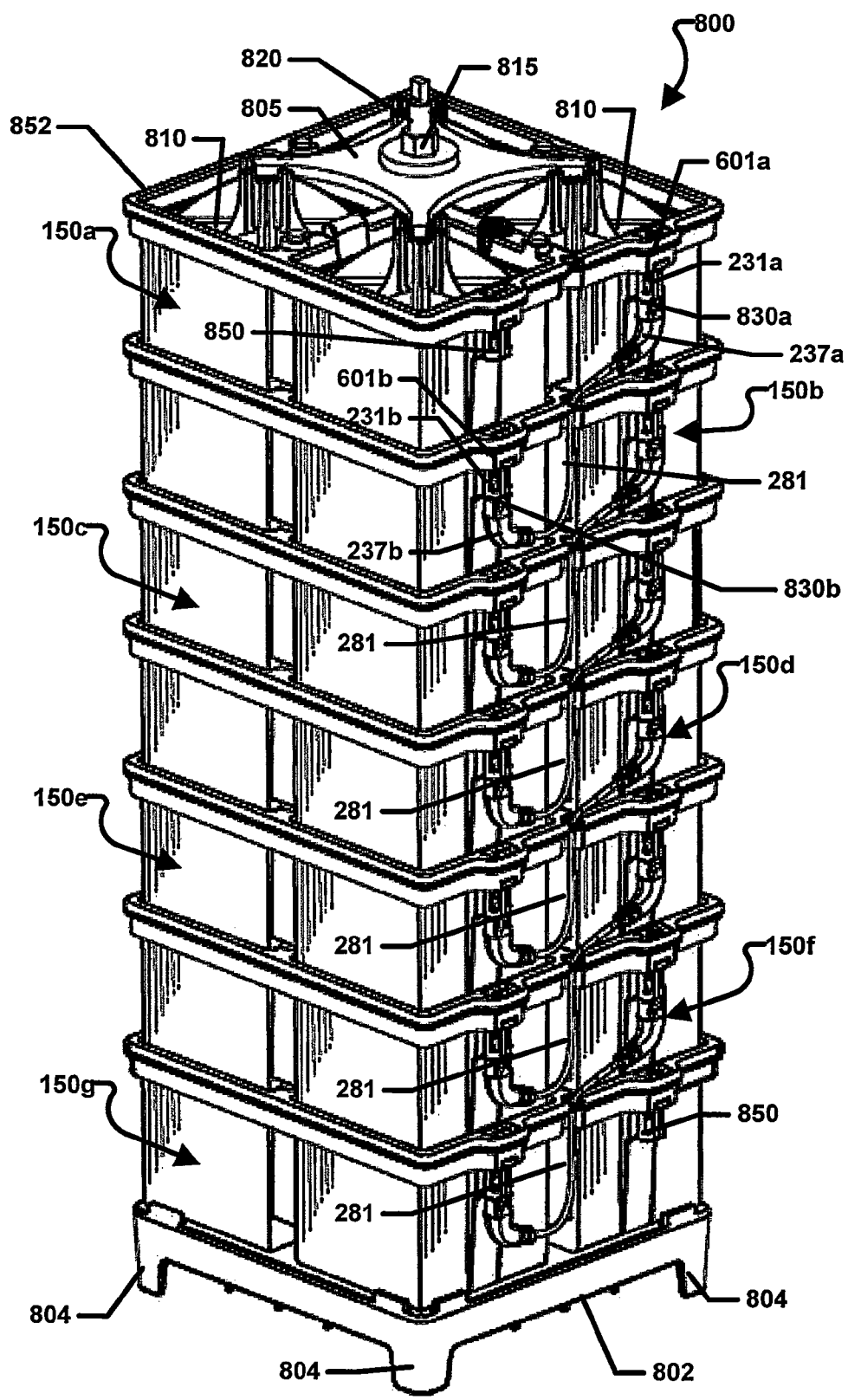
FIG. 8 illustrates a stack 800 of energy storage housings according to an embodiment.

FIG. 8 illustrates a stack 800 of housings 150a-150g according to an embodiment in which the jumper wire assembly 280 with a jumper wire 281 electrically connects adjacent housings. One end of the jumper wire assembly includes a second connector housing 237a (illustrated in FIG. 2G) connected to the first connector housing 830a at a positive terminal 601a in a first device housing 150a. The other end of the jumper cable assembly includes an additional second connector housing 237b, the additional second connector housing is connected to the first connector housing 830a at a negative terminal 601b in a second device housing 150b located above or below the first device housing 150a in the stack. While the jumper wire assembly 280 (number is not shown for clarity) preferably contains the same type of connector housing and pin on both of its ends in the embodiments described above, in an alternative embodiment, the assembly 280 may contain opposite types of housings and/or pins on its respective ends. In this alternative embodiment, each device housing 150 contains two pass-through connectors having opposite types of housings and/or pins. In this configuration, the assembly 280 can only be connected one way between adjacent device housings 150 in the stack to avoid human assembly error during stack connection.

As a non-limited example, the stack may have seven housings 150a-150g. Each energy storage housing 150a-150g, such as energy storage housing 150a, may receive the quick connect locking features from the second connector housing 237a. The locking features 331a are designed to interlock with the retaining features 231a of the first connector housing 830a. The jumper wire 281 may connect a positive terminal 601a of the energy storage housing 150a to a negative terminal 601*b* on the energy storage housing 150*b* beneath the energy storage housing 150*a*.

The locking features of the negative terminal of housing 150*b* are designed to interlock with retaining features 231*b* of the first connector housing 830*b* of the negative terminal. In an embodiment, the negative terminal connection may be the same as the positive terminal connections. In an embodiment, the positive terminal of the top energy storage housing 150*a* may connect to a negative terminal of the bottom energy storage housing 150*b*. In an alternative embodiment, the negative terminal of a top energy storage housing 150*a* may connect to the positive terminal of a bottom energy storage housing 150*b*.

The stack 800 may include a bottom pressure plate 802 and a top pressure plate 810 at the bottom and top of the stack, respectively. In an embodiment, the pressure plates 802, 810 are identical, which simplifies assembly and may save on costs. For example, operators may reduce their inventory costs by keeping a single replacement pressure plate to replace either the top pressure plate or the bottom pressure plate. This may eliminate the need to keep in inventory a different top plate and a different bottom plate in case either one is damaged.

The pressure plates 802, 810 may have free standing feet 804, which provide space between the pressure plates 802 and adjacent structures such as a support pallet and/or module lid discussed in U.S. patent application Ser. No. 13/666,452, entitled "Large Format Electrochemical Energy Storage Device Housing and Module," filed on Nov. 1, 2012 and incorporated herein by reference in its entirety. The pressure plates 802, 810 may also include a through hole configured to accept a binding member, such as a tie rod 820. The pressure plates 802, 810 may also include ribs for added strength and to aid in aligning the pressure plates so that the pressure plates may apply a pressure load at the desired locations. One or more elastic elements (e.g., silicone or rubber block) may be provided between the pressure plates 802, 810 and a housings 150.

The stack is secured to the bottom pressure plate 802 by a leaf spring 805 and a plurality of pressure transfer elements or pressure plates 810 disposed to apply a downward force against the top cover 852 at locations corresponding with locations of each of the four energy storage cells 510. Pressure is applied to the leaf spring 805 by tightening a nut 815 threaded on to a top threaded end of a rod 820. The rod 820 passes through a center hole 325 (illustrated in FIGS. 3A and 3B), that passes completely through each electrochemical energy storage device housing 150 in the stack such that a base end of the rod 820 passes through the entire stack of device housings 150*a*-150*g* and attaches to the bottom pressure plate 802. Accordingly, as the nut 815 is tightened, a compression force is generated under the nut 815 and the compression force is transferred to the leaf spring 805 and further transferred to the pressure plates 810. The pressure plates 810 substantially and uniformly distribute the pressure over the entire area of each energy storage cell area 510 through the cover 852.

In an embodiment, the cover 152 and base portion 351 (shown in FIGS. 3A and 3B) of each container 150*a*-150*g* is configured to transfer the pressure force applied by each of the pressure plates 810 through the cover to the energy storage cell 510 below, which in turn, transfers the pressure force to the next energy storage cell 510 below that in the below container 150 and so on through each energy storage cell of the expanded energy storage unit or stack 800. More specifically, each pressure plate 810 compresses all of the energy storage cells 510 of the stack 800 that are positioned below it. The downward force applied by the pressure plates 810 serves to directly compress energy storage cells which improves current collection by compressing the anode and cathode layers into contact with current collector elements disposed between the anode and cathode elements.

As further shown in FIG. 8, the expanded energy storage unit or stack 800 may include a plurality of jumpers cables 281 used to electrically interconnect the individual energy storage device housing 150. In particular, each jumper 281 extends from a pass through connector 230*a*, 230*b*, 230*c* (shown as 830 in FIG. 8) of one energy storage device housing 150 to a pass through connector of another energy storage device housing 150, such that the entire stack of energy storage units 150 is connected in series.

In an embodiment, the main jumpers connected to the expanded energy storage unit or stack 800 at the main input/output terminals 850 connect to an energy source (not shown) usable to charge or recharge the expanded energy storage unit or stack 800 or to a power load (not shown) in order to transfer energy stored in the expanded energy storage unit or stack 800 to the power load (e.g., through a system controller providing interfaces to the energy source and the power load). Additionally, the main input/output terminals may be used to couple the expanded energy storage unit or stack 800 to another expanded energy storage unit or stack 800 to connect them in series or in parallel using main terminals.

Figure 9:
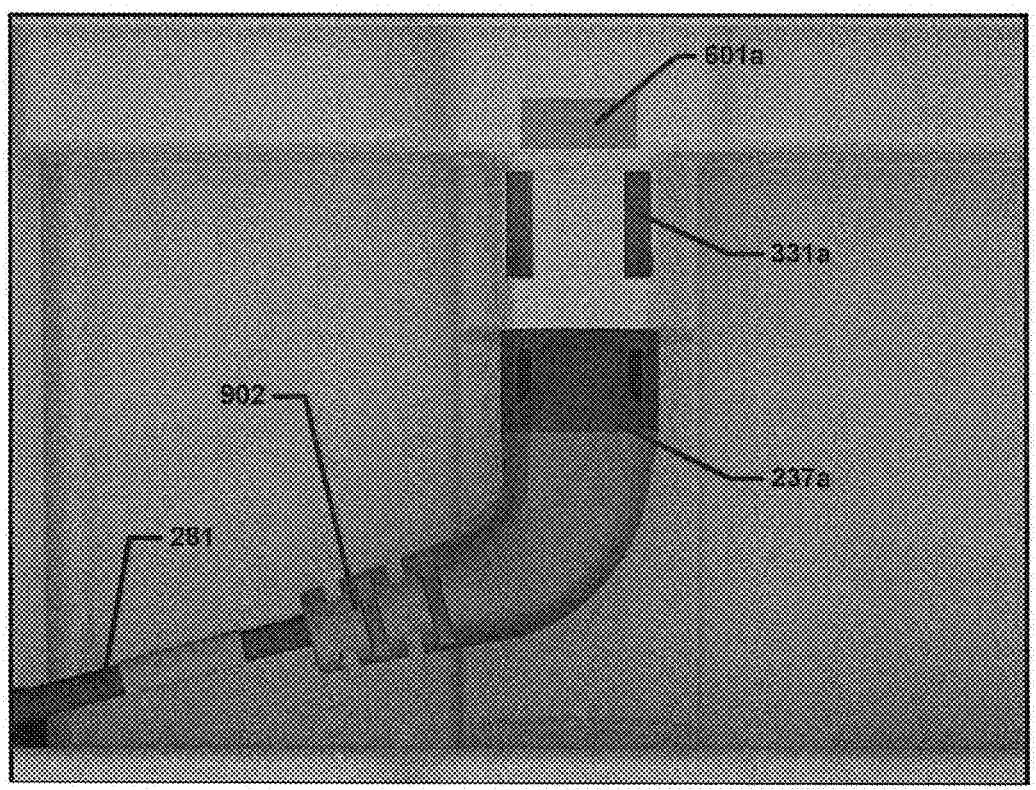
FIG. 9 illustrates a magnified view of a positive pass-through terminal from stack 800 of FIG. 8.

FIG. 9 illustrates a magnified view of the positive terminal of stack 800 of FIG. 8. As illustrated, the jumper wire assembly may have a jumper wire 281 with a flexible portion 902 attached to a second connector housing 237*a*. The flexible portion 902 is configured to provide flexibility when connecting the end portions of the jumper wire (e.g., the second connector housing 237*a*) to a negative terminal or a positive terminal. Also shown, the flexible portion 902 may form an angle (e.g., an obtuse angle) with a major portion of the second connector housing 237*a* allowing the jumper cable 281 to stretch across from one terminal of the stack 800 to a terminal on the other side of the stack.

Figure 10:
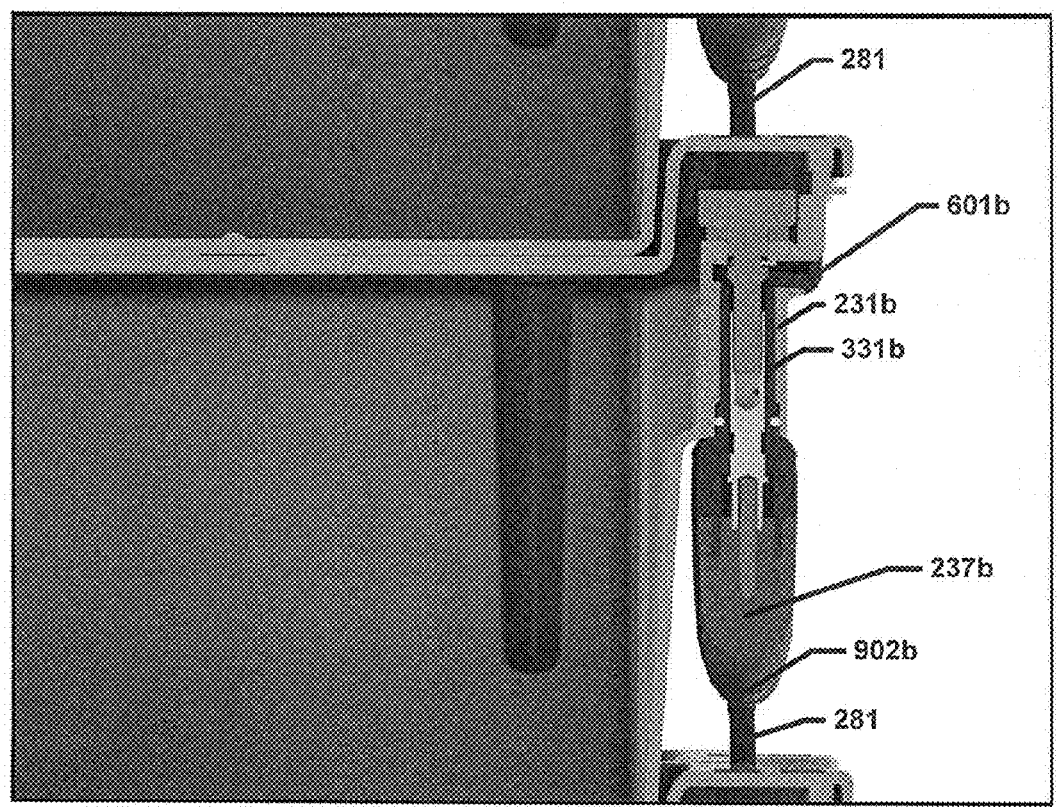
FIG. 10 illustrates a cut away view of the negative pass-through terminal of FIG. 8.

FIG. 10 illustrates a cut away view of the negative terminal 601*b* of FIG. 8. As illustrated, the negative terminal has a second connector housing 237*b* with locking features 331*b*. The locking features interlock with retaining features 231*b* of a first connector housing 230*b*. The second connector housing 237*b* may be attached to a flexible portion 902*b* of the jumper wire 281 and the flexible portion is configured to provide flexibility to an end portion of the jumper wire 281 which may be attached to a different second connector housing 230*a* for the positive terminal (e.g., a positive terminal of an energy storage device 150 directly above).

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. electrochemical energy devices and storage for electrical chemical energy devices), those skilled in the art will recognize that its usefulness is not limited thereto and that the present invention can be beneficially utilized in any number of environments and implementations where it is desirable to pass an electrical terminal through a sealed housing. Accordingly, the claims set forth below should be construed in view of the full breadth and spirit of the invention as disclosed herein.

What is claimed is:

1. An energy storage device, comprising:
   a device housing comprising a bottom, an opposing upper opening, sidewalls extending from the bottom to the opening, and a lip disposed around the opening and extending laterally outward from upper edges of the sidewalls; and
   a first pass-through connector comprising:
      an electrically insulating first connector housing integrated with a first one of the sidewalls, extending downward from the lip, and having a quick connect feature and an open lower end; and
      an electrically conductive pin extending vertically through the lip and into the first connector housing along the first sidewall of the device housing, such that a free end of the electrically conductive pin faces the open lower end of the first connector housing,
   wherein the quick connect feature comprises at least two retaining sockets that extend into the first connector housing.

2. The device of claim 1, further comprising:
   a plurality of electrochemical storage cells located inside the device housing; and
   at least one electrical conductor which electrically connects the pin to at least one electrochemical storage cell.

3. The device of claim 1, wherein the electrically conductive pin is at least one of a male connector pin or a female connector pin.

4. The device of claim 1, wherein the electrically conductive pin comprises a polygonal shaped terminal.

5. The device of claim 4, wherein the first pass-through connector comprises an anti-rotational feature to stabilize the electrically conductive pin located in the first connector housing.

6. The device of claim 3, wherein the electrically conductive pin comprises a non-polygonal shaped terminal.

7. The device of claim 6, wherein the electrically conductive pin comprises a disc-shaped terminal.

8. The device of claim 1, wherein each retaining socket comprises:
   a rectangular opening configured to compress a locking feature passing there through; and
   a cavity extending from the opening and comprising an engagement surface configured to engage with the locking feature.

9. The device of claim 1, wherein:
   the pin of the first pass-through connector is a male connector pin; and
   the device further comprises a second pass-through connector comprising an electrically insulating second connector housing integrated with the first sidewall of the device housing and having a quick connect feature, and an electrically conductive female connector pin located in the second connector housing.

10. A stack of electrochemical energy storage devices, comprising:
    device housings disposed on one another in a stack, each device housing comprising: a bottom, an opposing upper opening, sidewalls extending from the bottom to the opening, and a lip disposed around the opening and extending laterally outward from upper edges of the sidewalls, wherein each device housing contains:
       a plurality of electrochemical storage cells located inside the device housing;
       a pass-through connector comprising:
          an electrically insulating connector housing integrated with a first one of the sidewalls, extending downward from the lip, and having a quick connect feature and an open lower end; and
          an electrically conductive pin extending vertically through the lip and into the connector housing along the first sidewall of the device housing, such that a free end of the electrically conductive pin faces the open lower end of the first connector housing; and
       at least one electrical conductor which electrically connects the pin to at least one electrochemical storage cell; and
    a jumper wire assembly electrically connecting the pass-through connector of a first device housing in the stack to a pass-through connector of a second device housing in the stack;
    wherein:
       the jumper wire assembly comprises a wire, a first connector on a first end of the wire and a second connector on a second end of the wire;
       the first connector comprises:
          an electrically insulating connector housing having a quick connect feature which is connected to the quick connect feature of the pass-through connector of the first device housing; and
          an electrically conductive pin located in the connector housing which is in electrical contact with the pin of the pass-through connector of the first device housing; and
       the second connector comprises:
          an electrically insulating connector housing having a quick connect feature which is connected to the quick connect feature of the pass-through connector of the second device housing; and
          an electrically conductive pin located in the connector housing which is in electrical contact with the pin of the pass-through connector of the second device housing,
    wherein a first device housing in the stack comprises a base portion and a lid covering the base portion and supporting a base portion of an adjacent second device housing in the stack.

11. The stack of electrochemical energy storage devices of claim 10, wherein:
    the electrically conductive pin of the pass-through connector is at least one of a male connector pin or a female connector pin;
    each electrically conductive pin of the first and second connector of the jumper wire assembly comprises a different connector pin than the connector pin of the pass-through connector.

12. The stack of electrochemical energy storage devices of claim 10, wherein the electrically conductive pin of the pass-through connector comprises a polygonal shaped terminal.

13. The stack of electrochemical energy storage devices of claim 12, wherein the pass-through connector comprises an anti-rotational feature to stabilize the electrically conductive pin.

14. The stack of electrochemical energy storage devices of claim 13, wherein the electrically conductive pin of the pass-through connector comprises a non-polygonal shaped terminal.

15. The stack of electrochemical energy storage devices of claim 13, wherein the electrically conductive pin of the pass-through connector comprises a disc-shaped terminal.

16. The stack of electrochemical energy storage devices of claim 10, wherein the quick connect feature of the pass-through connector is at least one of a retaining feature and a locking feature, and wherein the quick connect features of the first and second connectors of the jumper wire assembly is different from the quick connect feature of the pass-through connector.

17. The stack of electrochemical energy storage devices of claim 16, wherein the quick connect feature of the pass-through connector is a retaining feature with at least two retaining sockets.

18. A stack of electrochemical energy storage devices, comprising:
   a stack of device housings, each device housing comprising: a bottom, an opposing upper opening, sidewalls extending from the bottom to the opening, and a lip disposed around the opening and extending laterally outward from upper edges of the sidewalls, wherein each device housing contains:
      electrochemical storage cells located inside the device housing;
      positive and negative pass-through connectors, each pass-through connector comprising:
      an electrically insulating connector housing integrated with a first one of the sidewalls, extending downward from the lip, and having a quick connect feature and an open lower end; and
      an electrically conductive pin extending vertically through the lip and into the connector housing, such that a free end of the electrically conductive pin faces the open lower end of the first connector housing; and
      a positive electrical conductor that electrically connects the pin of the positive pass-through connector to a cathode of at least one of the electrochemical storage cells; and
      a negative electrical conductor that electrically connects the pin of the negative pass-through connector to an anode of at least one of the electrochemical storage cells; and
   jumper wire assemblies electrically connecting the positive pass-through connectors of device housings in the stack to the negative pass-through connectors of adjacent device housings in the stack, the jumper wire assemblies each comprising:
      a first connector comprising an electrically insulating first connector housing having a quick connect feature which is connected to the quick connect feature of at least one of the positive pass-through connectors;
      a first electrically conductive pin disposed in the first connector housing and in electrical contact with the pin of the positive pass-through connector of at least one of the positive pass-through connectors;
      a second connector comprising an electrically insulating second connector housing having a quick connect feature that is connected to the quick connect feature of at least one of the negative pass-through connectors;
      a second electrically conductive pin disposed in the second connector housing and in electrical contact with the pin of the negative pass-through connector of at least one of the negative pass-through connectors; and
      a wire electrically connecting the first and second connectors.

* * * * *